(12) United States Patent
Haszler et al.

(10) Patent No.: US 6,337,147 B1
(45) Date of Patent: Jan. 8, 2002

(54) WELDABLE ALUMINUM PRODUCT AND WELDED STRUCTURE COMPRISING SUCH A PRODUCT

(75) Inventors: Alfred Johann Peter Haszler, Vallendar; Klaus Alfons Mechsner, Neuwied, both of (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/527,832

(22) Filed: Mar. 17, 2000

(30) Foreign Application Priority Data

Mar. 18, 1999 (EP) .............................................. 99200831

(51) Int. Cl.$^7$ ............................................... B32B 15/20
(52) U.S. Cl. ...................... 428/654; 148/415; 148/437; 148/440; 219/50; 420/540; 420/541; 428/615; 428/925; 428/926; 428/933; 428/934
(58) Field of Search ................................. 428/654, 925, 428/926, 933, 934, 615; 420/540, 541; 148/415, 437, 440; 219/50

(56) References Cited

U.S. PATENT DOCUMENTS 4,172,923 A * 10/1979 Kawase et al. ............. 428/654

FOREIGN PATENT DOCUMENTS

| GB | 1004868 | 9/1965 |
| GB | 1416134 | 12/1975 |
| WO | 9828130 | 7/1998 |

* cited by examiner

Primary Examiner—Robert R. Koehler
(74) Attorney, Agent, or Firm—Stevens, Davis, Miller & Mosher, LLP

(57) ABSTRACT

Improved shape and strength of the weld in a welded structure are obtained by use of a weldable aluminum product comprising a structural component which is a sheet, a plate or an extruded body and is made of an aluminum alloy containing not more than 1.5 wt % Zn. This component has, adhered on at least one side, a cladding layer made of an AA7xxx-series alloy having a corrosion potential lower than that of the alloy of the structural component. The alloy of the structural component is preferably an AA5xxx-series alloy containing Mg in the range 2 to 6 wt %.

22 Claims, 1 Drawing Sheet

WELDABLE ALUMINUM PRODUCT AND WELDED STRUCTURE COMPRISING SUCH A PRODUCT

FIELD OF THE INVENTION

The invention relates to a weldable aluminum product comprising a structural component in the form of sheet or plate product or an extruded product, for use as a structural member in a welded structure. Further the invention relates to a welded structure comprising at least one such aluminum product. Such welded structures include marine structures e.g. fixed structures, ships, aerospace vehicles, and land vehicles such as trucks, dump trucks, cars (automobiles) and railway vehicles. While in the following description of this invention reference is mainly made to aluminum sheet or plate products, it is to be understood that products based on aluminum extrusions are also included. As is conventional, the term "aluminum product" refers to aluminum alloy products.

BACKGROUND OF THE PRESENT INVENTION

When welding aluminum plates or sheets by means of fusion welding, such as MIG, TIG or plasma welding, in particular plates or sheets made of the Aluminum Association AA5xxx-series alloys having Mg as an alloying element in the range of 2 to 6 weight %, for example welding head-to-head by using a V-bevel, a weld bead is formed having a relatively sharp angle between the base material and the weld toe. In a severe and undesirable case even an undercut may be formed. Usually fatigue cracks start at a so-called hot-spot, which is the notch where the weld bead starts. Because of this relatively sharp angle or notch several organizations setting standards, e.g. for ship-building, indicate that the fatigue behavior of the welded construction detail is essentially independent of the aluminum alloys used, but is dependent on the construction notch effect. This becomes more apparent for the AA5xxx-series alloys having a relatively high Mg content. For this reason an aluminum alloy having improved strength may still be assessed on its fatigue performance as if it were a less strong aluminum alloy, because of the notch effect. And therefore the acceptable "global stresses" in a welded construction detail are reduced to lower levels than the aluminum alloys used would withstand in themselves.

It is known to improve the conformation of the weld bead zone after welding, e.g. by hammer preening or weld re-melting, but such an extra step should be avoided if possible. There is therefore a need for a product providing an improved weld bead in the welding process.

In the context of disclosure of the invention below, some other prior art documents are here mentioned, though they are not concerned with the problem described above.

WO98/28130 describes providing a clad layer of filler material on an aluminum core sheet, for the purpose of providing a filler for a welding pool.

In light structures, not assembled by welding together of components, it is known to provide a clad layer on a core sheet, the clad layer having a corrosion potential lower than that of the core sheet. GB-A-1004868 describes materials for use in domestic and industrial water heaters having low corrosion performance, particularly illustrated by an AA6061 alloy sheet clad with an AA7072 alloy layer containing up to 0.01% Cu. Weldability is not mentioned. GB-A-1416134 describes alloys of the AA4xxx-series clad with an AA7072 layer to give corrosion resistance. Formation of tubes of this material by welding is mentioned, but weldability of the material is not discussed.

SUMMARY OF THE INVENTION

An object of the invention is to provide a weldable aluminum product for use as a structural member in a welded structure, which gives the welded structure an improved fatigue life.

To achieve this object there is provided in accordance with the invention a weldable aluminum product comprising a structural component which is a sheet, a plate or an extruded body and is made of an aluminum alloy containing not more than 1.5 weight percent (wt %) Zn and, adhered on at least one side of said structural component, a cladding layer made of an AA7xxx-series alloy having a corrosion potential lower than that of said alloy of said structural component.

With this product there is achieved the effect of obtaining after welding a much smoother transition from the parent plate or sheet to the weld metal than has been known before in welding of aluminum alloys, in particular of AA5xxx-series alloys. In the weld there is a higher barrier for the crack initiation stage with a resulting increase in fatigue life, and thus a fatigue limit can be achieved which may be considerably higher than that for welded joints known so far. Furthermore, this smoother transition overcomes the need for additional modification techniques of the weld toe profile, such as local grinding or weld toe remelting techniques. Furthermore, it has been observed that the flow behavior of the molten metal during welding is improved, resulting in a reduced amount of undesirable inclusions in the weld metal, such as oxides.

The use of the clad layer or layers in the invention can not only improve the "hot spot" of the welded joint, but may also produce compressive stress at the surface of the welded structure, because of the difference in contraction of the structural component and the clad layer. This may reduce residual tensile stress due to contraction of the weld bead and thus also influence fatigue behavior positively.

An additional advantage of welding the cladded aluminum product of the invention is that surface compressive residual stresses may be introduced in the regions where fatigue cracks are likely to initiate, which may extend fatigue life significantly. By applying a cladding on one or both sides of the product, additional laborious techniques of introducing residual stresses, e.g. peening, can be overcome.

For certain applications due to the cladding there will be advantages such as visual improvement and better forming (shaping) behavior because the relatively soft surface avoids crack initiation. Furthermore, the weldable cladding allows for higher strength tempers to be used for the alloy of the structural component because of the improved corrosion behavior due to the anodic protection given by the cladding used.

Although the invention may be applied to all kinds of aluminum alloys as the structural member having a corrosion potential higher than that of the cladding applied, the effects found are most pronounced in AA5xxx-series alloys having Mg as an alloying element in the range of 2 to 6 weight percent. The amount of Zn is preferably 0.4 to 1.5 weight percent.

Preferably the thickness of the structural component or core is in the range of up to 40 mm, more preferably in the range of 0.5 to 20 mm.

Preferably the thickness of the or each cladding layer is in the range of up to 20% of the thickness of the structural component. The minimum thickness is preferably 1% of that of the structural component, and more preferably the thickness of the or each cladding layer is 1 to 15% of the thickness of the structural component, and most preferably 1 to 10% of the thickness of the structural component, more particularly 2 to 10%.

Adhesion between the cladding layer or layers and the structural component (core sheet or core plate) is very important to obtain structural integrity after welding. Preferably the adhesion is obtained by rolling. Suitable roll-bonding processes are known. Alternatively, the adhesion is obtained by casting a composite ingot having simultaneously cast contacting portions of respectively the materials of the structural component and the cladding layer or layers, followed by rolling of the ingot obtained. This provides a mainly oxide free interface. In the case where the structural component is an extruded body, the cladding layer may be applied by any suitable method, for example roll-bonding.

In one embodiment of the aluminum product in accordance with the invention the structural component is made of an AA5083-series alloy, an AA5059-series alloy, an AA5086-series alloy, or an alloy which is a modification of one of these.

A very advantageous AA5xxx-series alloy for the structural component has the following composition, in weight percent:

| Mg | 5.0–6.0, preferably 5.0–5.6 |
| Mn | 0.6–1.2, preferably 0.7–0.9 |
| Zn | 0.4–1.5, preferably 0.4–1.2 |
| Zr | 0.05–0.25 |
| Cr | 0.3 max. |
| Ti | 0.2 max. |
| Fe | 0.5 max. |
| Si | 0.5 max. |
| Cu | 0.4 max. |
| Ag | 0.4 max. |
| Sc | 0.5 max. | balance aluminum and inevitable impurities.

In this embodiment with the structural component clad with a AA7xxx-series alloy, a smooth angle between the parent component and the weld toe of 130° or more can be obtained, which allows for application in welded constructions designed for fatigue strength, since with the smoother weld groove the fatigue properties of the welded construction details come close to the welded fatigue properties of the parent material, as tested in SN-curves.

Another very advantageous AA5xxx-series alloy for the structural component has the following composition, in weight percent:

| Mg | 3.0–4.5, preferably 3.5–4.5 |
| Mn | 0.4–1.2, preferably 0.4–0.75 |
| Zn | 0.4–1.5, preferably 0.4–0.9 |
| Zr | 0.05–0.25 |
| Cr | 0.3 max. |
| Ti | 0.2 max. |
| V | 0.2 max. |
| Fe | 0.5 max. |
| Si | 0.5 max. |
| Cu | 0.2 max. |
| Ag | 0.4 max. |
| Li | 0.5 max. |
| Sc | 0.5 max. | balance aluminum and inevitable impurities.

Preferably, in the aluminum product in accordance with the invention, the cladding layer is made of an AA7xxx-series alloy comprising zinc in a range of 0.3 to 5.0 weight %, more preferably in a range of 0.3 to 2.5 weight %, and more preferably made of an AA7072-series alloy. It has been found that by applying an AA7xxx-series alloy as cladding having zinc in the indicated range, an improved corrosion protection is provided to the heat-affected zone in particular. The heat-affected zone in Mg-containing alloys in particular has usually the worst microstructure with respect to corrosion resistance due to the high precipitation density, which limits the application of the welded structure obtained in particular in higher temperature applications, typically above 80° C. The cladding remains solid and essentially undisturbed during welding in the region near the heat-affected zone. Thus, after welding, a good anodic protection is obtained for the critical heat-affected zone due to the presence of the zinc. Additionally, the cladding provides an anodic corrosion protection to the structural component which is not affected due to the welding.

AA7072 alloys have the following composition, in weight percent:

| Si + Fe | 0.7 max. |
| Cu | 0.1 max. |
| Mn | 0.1 max. |
| Ng | 0.1 max. |
| Zn | 0.8–1.3 | balance Al and inevitable impurities.

In another aspect of the invention there is provided in an aluminum welded structure having at least two aluminum alloy members joined by welding, at least one of the members being an aluminum product of the invention as described above.

Typical welded structures to which the invention is applicable include parts of marine transportation vessels such as catamarans of monohull type, fast ferries, high speed light craft, fixed marine structures, aerospace vehicles, land transportation vehicles such as cars, trucks, lorries and railway vehicles and silos and armor plate.

Suitable welding techniques which may be applied include TIG, MIG, laser and electric arc welding, and plasma welding.

Various suitable filler metals may be applied during the welding depending largely on the composition of the structural component of the weldable aluminum product, and include AA5183 and AA5087 in the case where the structural component is made from an AA5xxx-series alloy.

BRIEF DESCRIPTION OF THE DRAWINGS

The invention will be further explained with reference to the drawings in which.

DETAILED DESCRIPTION OF THE PREFERRED EMBODIMENTS

Figure 1A:
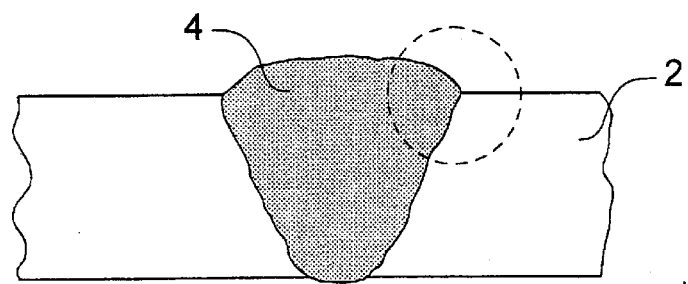
FIG. 1A represents schematically the weld zone after welding of plates made of typical conventional AA5xxx-series alloy.
Figure 1B:
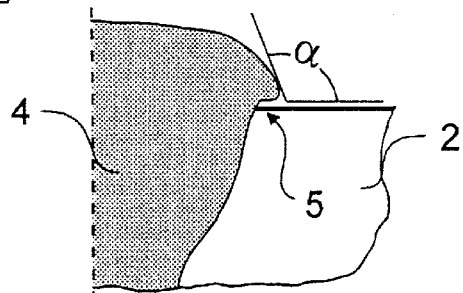
FIG. 1B is an enlargement of the circled portion of FIG. 1A at the weld bead.

FIGS. 1A and 1B show the situation after welding of non-cladded sheets or plates 2 of AA5xxx-series alloy showing a relatively sharp angle α between the parent plate or sheet 2 and the weld metal 4, which even may give rise to an undercut zone 5. Typically the angle α is smaller than 130°.

Figure 2A:
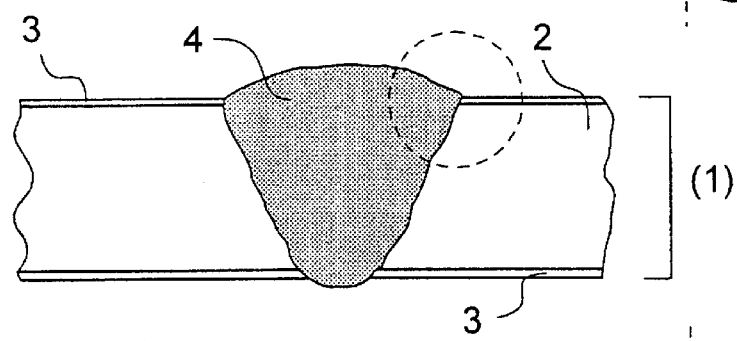
FIG. 2A represents schematically the weld zone after welding of a product in accordance with this invention.
Figure 2B:
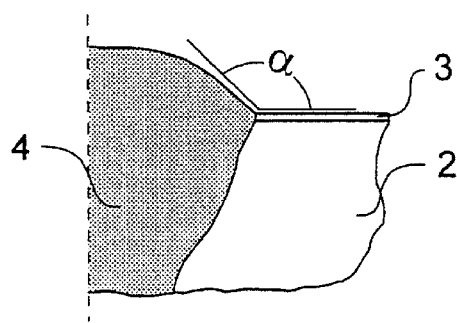
FIG. 2B is an enlargement of the circled portion of FIG. 2A at the weld bead.

FIGS. 2A and 2B, also represent the situation after welding, and show that, when welding a product 1 in accordance with the invention in which the structural component 2 is made of an AA5xxx-series alloy clad on both sides with an AA7xxx-series alloy layer 3, the angle α between the parent product and the weld metal 4 is much smoother, which will give rise to an improved fatigue life.

Figure 3:
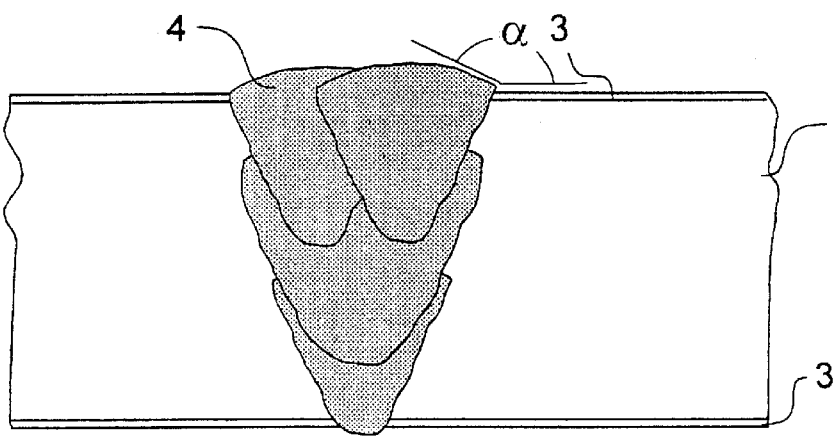
FIG. 3 represents schematically the weld zone as in FIG. 2A of a weld of a product in accordance with the invention, with the difference that in this case four weld passes have been applied.

FIG. 3, also represents the situation after welding, and schematically shows a case where four welding passes are made, as illustrated, when welding a product 1 in accordance with the invention in which the structural component 2 is made of an AA5xxx-series alloy clad on both sides with an AA7xxx-series alloy layer 3. FIG. 3 shows that, in this case, the angle α between the parent product and the weld metal 4 is much smoother, which will give rise to an improved fatigue life.

EXAMPLES

The following are non-limiting examples of the invention.

Example 1

In an example in accordance with the invention sheets of core alloy forming the structural component of 7 mm thickness having the composition of, in weight percent, 2.56% Mg, 1.14% Mn, 0.29% Zn, 1.11% Si, 0.46% Fe, balance aluminum and inevitable impurities are clad by roll-bonding on both sides with AA7072 alloy layers each of 6% thickness of the core alloy and having a corrosion potential lower than that of the core alloy. Pairs of these sheets were welded by means of MIG and TIG. The welding configuration was head-to-head, often also referred to as butt-weld samples. After welding the angle α between the parent plate and the weld metal was 130° or more and further showed no undercuts, which will result in an increase in fatigue life. In this case, the composition of the alloy of the structural component (core sheet) was a non-standard scrap one, in order to test the welding result.

Example 2

Pairs of unclad AA5083 plates, unclad AA5059 plates and AA5059 plates clad on both sides with an AA7072 layer were butt-welded by MIG using AA5183 filler wire. These plates were made on a laboratory scale. The effects of the clad layer on tensile properties, corrosion resistance and weld geometry have been investigated. The plates are 8 mm thick. In the case of the clad plate, the thickness of each of the AA7072 clad layers was 2% of the total thickness of the product.

In the welding, the welding speed was 0.7 m/min., the gas was Ar, and three weld passes were made.

All plates were of temper H321. The AA5059 alloy and the AA7072 alloy clad had the following compositions:

| AA5059 | (wt %) |
|---|---|
| Si | 0.067 |
| Fe | 0.097 |
| Cu | 0.009 |
| Mn | 0.784 |
| Mg | 5.296 |
| Cr | 0.010 |
| Zr | 0.138 |
| Zn | 0.550 |
| Ti | 0.023 | balance Al and inevitable impurities.

| AA7072 | (wt %), used as clad layer |
|---|---|
| Si | 0.17 |
| Fe | 0.28 |
| Cu | 0.005 |
| Mn | 0.009 |
| Mg | 0.001 |
| Cr | 0.002 |
| Zn | 1.18 |
| Ti | 0.021 | balance Al and inevitable impurities.

The clad layers were applied by roll-bonding.

The properties of the unwelded plates were established using small Euronorm-specimens and tested according to the EN 10002 specification. The cross weld tensile specimens have been machined according to DNV specification "Rules for Ships", January 1996, Section 1, with a gauge length of 32 mm (width of weld+2 times plate thickness). Notched bar impact tests were performed according to ASTM norm E23 using Charpy impact test specimens having a V-shaped notch.

To establish the corrosion performance of the clad AA5059 material in comparison with unclad AA5059 and AA5083, the ASSET test (ASTM G66), the SWAAT test (ASTM G85) and the EXCO test (ASTM G34) were carried out using specimens sensitized up to 25 days at 100° C.

Results

A: Tensile Properties of Unwelded Plate

To assess properties of the unwelded plates small Euronorm specimens were machined in L and LT direction and tested according to EN 10002. Two specimens were used for each alloy. Table 1 compares the tensile properties of plate material of AA5083, AA5059 and AA5059 clad with AA7072. The AA5059 material clad with AA7072 shows lower values in comparison with the non-clad material of 6% in LT- and 10% in L-direction in proof stress and 5% for both directions in tensile strength.

TABLE 1

Tensile properties of plate material

| Alloy | LT-direction | | | L-direction | | |
|---|---|---|---|---|---|---|
| | PS (MPa) | UTS (MPa) | Elongation (%) | PS (Mpa) | UTS (Mpa) | Elongation (%) |
| AA5083 | 237/240 | 348/352 | 18.4/19.6 | 256/257 | 351/351 | 16.0/16.4 |
| AA5059 | 264/264 | 385/383 | 13.0/15.0 | 294/294 | 391/394 | 14.0/14.0 |
| AA5059/ AA7072 | 248/248 | 366/365 | 18.4/18.4 | 266/265 | 369/373 | 16.2/17.0 |

B: Tensile Properties Across the Weld Seam

Table 2 shows the cross weld tensile properties, which were established according to EN 10002 specification.

Specimens according to DNV "Rules for Ships", January 1996, Section 1 were used, having a gauge length of 32 mm. Three specimens were used for each alloy; Table 2 gives the average results.

TABLE 2

Tensile properties of welded specimens

| Alloy | PS (MPa) | UTS (MPa) | A32 (%) |
|---|---|---|---|
| AA5083 | 140 | 298 | 15.8 |
| AA5059 | 152 | 301 | 13.7 |
| AA5059/AA7072 | 163 | 312 | 11.8 |

The comparison of the cross weld properties of AA5083, AA5059 and AA5059 clad with AA7072 shows that in these tests the clad material reaches the levels of 160 MPa in yield and 300 MPa in tensile strength. Apparently, cladding of AA5059 results in an increase in strength of approximately 10 MPa in both the yield and the ultimate tensile strength.

C: Notched Bar Impact Test

Notched bar impact tests were performed according to the ASTM norm E23 using Charpy impact test specimens having a V-shaped notch. The results for the unwelded plate can be seen in Table 3 for the fracture codes L-T and T-L.

TABLE 3

Notched bar impact data for the unwelded plate

| Alloy | Fracture code | Absorbed energy [J/cm$^2$] |
|---|---|---|
| AA5083 | L-T | 20 |
| | T-L | 14 |
| AA5059 | L-T | 21 |
| | T-L | 15 |

TABLE 3-continued

Notched bar impact data for the unwelded plate

| Alloy | Fracture code | Absorbed energy [J/cm$^2$] |
|---|---|---|
| AA5059/AA7072 | L-T | 16 |
| | T-L | 16 |

In the welded structures Charpy notch specimens were taken with the notch in the middle of the weld seam and with the notch in the heat affected zone (HAZ). The direction of crack propagation is parallel to the weld seam. The results are listed in Table 4.

TABLE 4

Notched bar impact data for the welded specimens

| Alloy | Notch position | Absorbed energy (J/cm$^2$) |
|---|---|---|
| AA5083 | weld | 31 |
| | HAZ | 34 |
| AA5059 | weld | 33 |
| | HAZ | 33 |
| AA5059/AA7072 | weld | 34 |
| | HAZ | 38 |

D: Corrosion Resistance

ASSET Test

Welded specimens of AA5083, AA5059 and AA5059 clad with AA7072 were sensitized at 100° C. for 7, 16 and 25 days and tested according to ASTM G66.

In this test, the AA5083 material shows no corrosion attack when no sensitization treatment is applied. After sensitizing for 7 days at 100° C. and Asset testing, pitting grade PA/PB (from N, PA-PC) is observed in the AA5083 base material. Further sensitization up to 25 days at 100° C. causes a concentration of pits grade PB/PC in the area where the HAZ meets the base material.

The AA5059 material also shows no corrosion attack after welding without sensitization. Sensitizing at 100° C. for 7 days does not influence the corrosion performance of the AA5059 welded joint. No corrosion attack was observed, either in the weld seam, HAZ or in the base material. Sensitization up to 16 and 25 days leads to exfoliation in the HAZ having an exfoliation degree EB (from N, EA-ED). The base material is not attacked after a sensitizing treatment up to 25 days.

The AA5059 material clad with AA7072 shows a dense pattern of small pits (PB) homogeneously distributed in both the HAZ and the base material. No exfoliation was found after a sensitization up to 25 days at 100° C. The sensitization treatment changes the precipitation density in the AA5059 material but does not influence the AA7072 clad material. Thus, the corrosion performance of the AA5059 plate material clad with AA7072 is independent of the sensitization effect. The corrosion performance of the clad material having a pitting degree PB is comparable with the corrosion performance of AA5083 after 7 days of sensitizing.

SWAAT and EXCO Tests

Beside the ASSET test, designed to assess the corrosion susceptibility of 5xxx series alloys, SWAAT and EXCO tests have been performed to determine differences in the corrosion resistance between the AA5059 with and without clad layer. Welded specimens of AA5083, AA5059 and AA5059 clad with AA7072 were sensitized at 100° C. for 7 days and tested for SWAAT performance according to ASTM G85. Since the EXCO test gives a measure for the exfoliation corrosion susceptibility of 2xxx and 7xxx series alloys, only the AA5059 clad with AA7072 has been tested using the EXCO procedure. It was established, that there is no significant difference in performance of the AA5083, AA5059 and AA5059 clad with AA7072 in the SWAAT test. The EXCO test gave no indication of severe corrosion attack on the AA7072 clad material.

E: Summary of Conclusions

The tensile properties of the AA5059 material clad with AA7072 after welding are approximately 10 MPa higher in comparison with unclad AA5059 alloy material. Before welding the tensile properties of the clad material are slightly lower than the tensile properties AA5059 plate material (this reduction is expected, due to the presence of the clad layers).

In non-sensitized condition after the ASSET test, AA5059 material clad with AA7072 shows pitting of grade PB, whereas the AA5059 material shows no corrosion attack. After a sensitization of 25 days at 100° C. AA5059 shows exfoliation in the HAZ, whereas the corrosion performance of the AA5059 plate material clad with AA7072 is not effected by sensitization.

The corrosion performance of AA5059 material clad with AA7072 is comparable with the corrosion performance of AA5083.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A weldable aluminum product comprising a structural component which is a sheet, a plate or an extruded body, and is made of an aluminum alloy containing not more than 1.5 wt % Zn, and adhered on at least one side of said structural component, a cladding layer made of an AA7xxx-series aluminum alloy having a corrosion potential lower than that of said alloy of said structural component, wherein said alloy of said structural component is an AA5xxx-series aluminum alloy containing Mg in the range 2 to 6 wt %.

2. The weldable aluminium product according to claim 1, wherein said alloy of said structural component contains Zn in the range 0.4 to 1.5 wt %.

3. The weldable aluminium product according claim 1, wherein said alloy of said structural component is selected from AA5083, AA5059 and AA5086 alloys.

4. The weldable aluminium product according to claim 2, wherein said alloy of said structural component contains, in weight %:

| | |
|---|---|
| Mg | 5.0–6.0 |
| Mn | 0.6–1.2 |
| Zn | 0.4–1.5 |
| Zr | 0.05–0.25 |
| Cr | 0.3 max. |
| Ti | 0.2 max. |
| Fe | 0.5 max. |
| Si | 0.5 max. |
| Cu | 0.4 max. |
| Ag | 0.4 max. |
| Sc | 0.5 max. | balance aluminium and inevitable impurities.

5. The weldable aluminium product according to claim 1, wherein said structural component has two said cladding layers, one on each of two opposite sides thereof.

6. The weldable aluminium product according to claim 1, wherein each said cladding layer has a thickness which is not more than 20% of the thickness of said structural component.

7. The weldable aluminium product according to claim 1, wherein said alloy of each said cladding layer is an AA7072 alloy.

8. A welded structure comprising at least two aluminum alloy members joined by welding, wherein at least one of said members is a welded aluminum product according to claim 1.

9. The welded structure according to claim 8, which is a part of a marine structure, a ship, a land vehicle or an aerospace vehicle.

10. A method of use for a weldable aluminium product according to claim 1, comprising constructing a welded structure, wherein said product is welded to at least one member of said welded structure as a structural member in said welded structure.

11. The method of use according to claim 10, wherein the welded structure is a part of a marine structure, a ship, a land vehicle or an aerospace vehicle.

12. The weldable aluminum product according to claim 2, wherein said alloy of said structural component is selected from AA5083, AA5059 and AA5086 alloys.

13. The weldable aluminum product according to claim 2, wherein said structural component has two said cladding layers, one on each two opposite sides thereof.

14. The weldable aluminum product according to claim 2, wherein each said cladding layer has a thickness which is not more than 20% of the thickness of said structural component.

15. The weldable aluminum product according to claim 4, wherein each said cladding layer has a thickness which is not more than 20% of the thickness of said structural component.

16. A welded structure comprising at least two aluminum alloy members joined by welding, wherein at least one said members is a welded aluminum product according to claim 2.

17. A welded structure comprising at least two aluminum alloy members joined by welding, wherein at least one said members is a welded aluminum product according to claim 4.

18. The weldable aluminium product according to claim 2, wherein said alloy of said structural component contains, in weight %:

| | |
|---|---|
| Mg | 3.0–4.5 |
| Mn | 0.4–1.2 |
| Zn | 0.4–1.5 |
| Zr | 0.05–0.25 |
| Cr | 0.3 max. |
| Ti | 0.2 max. |
| V | 0.2 max |
| Fe | 0.5 max. |
| Si | 0.5 max. |
| Cu | 0.2 max. |
| Ag | 0.4 max. |
| Li | 0.5 max. |
| Sc | 0.5 max. | balance aluminium and inevitable impurities.

19. The weldable aluminium product according to claim 18, wherein each said cladding layer has a thickness which is not more than 20% of the thickness of said structural component.

20. The weldable aluminium product according to claim 18, wherein said alloy of said structural component contains, in weight %, Mg 3.5 to 4.5.

21. The weldable aluminium product according to claim 18, wherein said alloy of said structural component contains, in weight %, Mn 0.4 to 0.75.

22. The weldable aluminium product according to claim 18, wherein said alloy of said structural component contains, in weight %, Zn 0.4 to 0.9.

* * * * *